United States Patent
Kruse et al.

(10) Patent No.: US 6,655,127 B2
(45) Date of Patent: Dec. 2, 2003

(54) PRE-BURNER FOR LOW TEMPERATURE TURBINE APPLICATIONS

(75) Inventors: William D. Kruse, Redondo Beach, CA (US); Thomas J. Mueller, Long Beach, CA (US); John J. Weede, Rochester, MI (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 10/328,909

(22) Filed: Dec. 24, 2002

(65) Prior Publication Data

US 2003/0192301 A1 Oct. 16, 2003

Related U.S. Application Data

(62) Division of application No. 09/761,957, filed on Jan. 17, 2001, now Pat. No. 6,505,463.

(51) Int. Cl.[7] .................................................. F02K 9/48
(52) U.S. Cl. .......................................................... 60/259
(58) Field of Search ........................... 60/39, 462, 218, 60/246, 259

(56) References Cited

U.S. PATENT DOCUMENTS

| | | | |
|---|---|---|---|
| 2,785,532 A | 12/1957 | Kretschmer |
| 2,949,007 A | 12/1960 | Aldrich et al. |
| 3,062,004 A | 12/1962 | Dooley et al. |
| 3,577,735 A | 5/1971 | Schmidt |

*Primary Examiner*—Louis J. Casaregola
(74) *Attorney, Agent, or Firm*—Harness, Dickey & Pierce, P.L.C.

(57) ABSTRACT

A method is provided for using high concentrations of hydrogen peroxide to drive a turbine (20') in a turbopump fed rocket engine (12'). The method includes the steps of: (a) receiving fuel into a fuel rich pre-burner (50); (b) receiving high concentrations of hydrogen peroxide into the pre-burner (50); (c) converting the fuel and hydrogen peroxide into a fuel rich gas; and (d) passing the fuel rich gas through a turbine (20'), thereby using high concentrations of hydrogen peroxide to drive the turbine. Thus, by utilizing a fuel rich pre-burner (50) that operates at a very low mixture ratio, the drive gas for a turbine (20') can be maintained at moderate temperature levels.

3 Claims, 2 Drawing Sheets

PRE-BURNER FOR LOW TEMPERATURE TURBINE APPLICATIONS

This application is a is a divisional of application of application Ser. No. 09/761,957 filed on Jan. 17, 2001 now U.S. Pat. No. 6,505,463.

BACKGROUND OF THE INVENTION

1. Field of the Invention

This invention relates generally to turbopump fed rocket engines, and, more particularly, to a fuel rich pre-burner that operates at a very low mixture ratio to drive a turbine in a hydrogen peroxide based rocket engine.

2. Discussion of the Related Art

Rocket engines typically employ liquid propellants which are burned to form hot gases. The high pressure hot gases are then expanded though a specially shaped nozzle, thereby producing a thrust force for the rocket. The propellants usually consist of a liquid fuel and a liquid oxidizer. In at least one well known hydrogen peroxide based engine design, the liquid oxidizer may also be used to drive a turbine. In this case, a portion of the liquid oxidizer is decomposed into an oxidizing gas by passing it though an appropriate catalyst. The oxidizing gas is then used to drive the turbine which in turn may be used to drive a fuel pump and/or a oxidizer pump.

Hydrogen peroxide is at least one liquid oxidizer commonly used in turbo pump fed rocket engines. However, as the demands for rocket engine performance increase, higher concentrations of hydrogen peroxide are needed to meet these demands. Unfortunately, high concentrations of hydrogen peroxide (e.g., >92%) produce gas temperatures that exceed the temperature and oxidation limits of traditional materials used for turbines. In order to use high concentrations of hydrogen peroxide, designers will need to develop new materials which can withstand the higher temperature gases that are passed through the turbine.

Therefore, it is desirable to provide a turbopump fed rocket engine that can utilize high concentrations of hydrogen peroxide or other monopropellants that decompose at high temperatures. By utilizing a fuel rich pre-burner that operates at a very low mixture ratio to drive the turbine, the temperature of the drive gas can be maintained at moderate levels, thereby enabling the use of conventional materials for the turbine. Thus, high performance turbopump fed rocket engines can be developed independent of the creation of a new high temperature resistant turbine material.

SUMMARY OF THE INVENTION

In accordance with the teachings of the present invention, a method is provided for using monopropellant oxidizers having high decomposition temperatures to drive a turbine in a turbopump fed rocket engine. The method includes the steps of: (a) providing rocket fuel to a preburner; (b) providing a portion of the oxidizer to the preburner; (c) converting the fuel and the oxidizer into a fuel rich gas; and (d) passing the fuel rich gas through a turbine, thereby using at least a portion of the oxidizer to drive the turbine in a rocket engine.

Additional objects, features and advantages of the present invention will become apparent from the following description and appended claims taken in conjunction with the accompanying drawings.

DETAILED DESCRIPTION OF THE PREFERRED EMBODIMENTS

Figure 1:
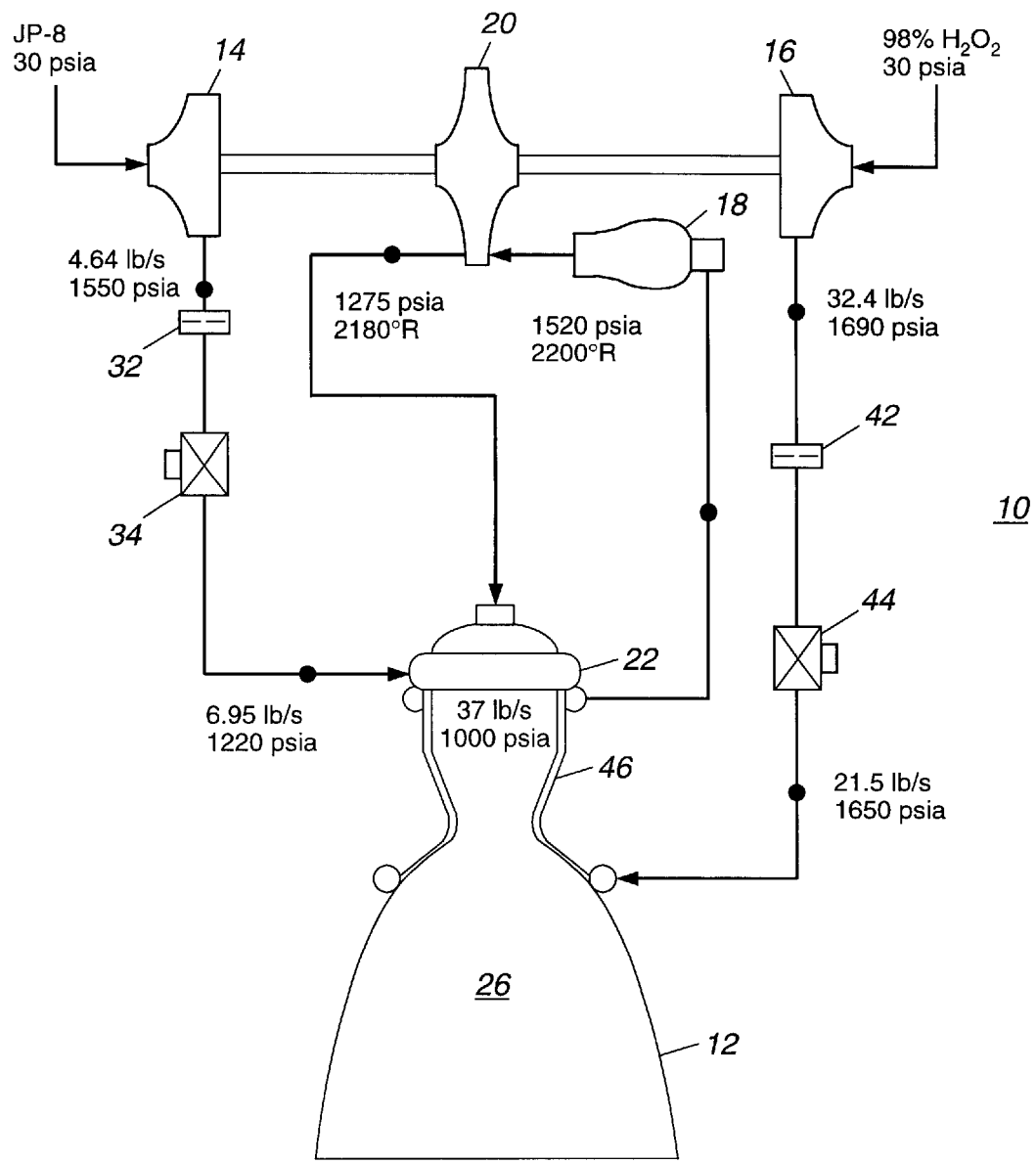
FIG. 1 is a block diagram of a prior art propellant supply system for a turbopump fed rocket engine.

FIG. 1 illustrates a propellant supply system 10 for a conventional turbopump fed rocket engine 12. The propellant supply system 10 generally includes a fuel pump 14, an oxidizer pump 16, a gas generator 18 and a turbine 20. The engine 12 is further defined to include an injector 22, and a main combustion chamber 26.

Liquid rocket fuel is typically stored at low pressures in a fuel tank (not shown). The fuel pump 14 provides pressurized fuel from the fuel tank to the injector 22 of the engine 12. Prior to reaching the engine, the pressurized fuel may pass through at least one orifice 32 and a main fuel throttle valve 34.

Likewise, liquid oxidizer is stored at low pressures in an oxidizer tank (not shown). The oxidizer pump 16 provides pressurized liquid oxidizer to gas generator 18. Prior to reaching the gas generator 18, the liquid oxidizer may pass through at least one orifice 42, a main oxidizer throttle valve 44 and through a cooling jacket 46 that is formed along the outer surface of the combustion chamber. In this way, the liquid oxidizer may be used to cool the high temperatures associated with the main combustion chamber 26 of the engine 12.

The liquid oxidizer is then decomposed into an oxidizing gas by passing it through an appropriate catalyst inside the gas generator 18. The oxidizing gas is used to drive the turbine 20, which in turn is used to drive the fuel pump 14 and/or the oxidizer pump 16. Lastly, the pressurized fuel and the oxidizing gases are injected by the injector 22 into the main combustion chamber 26 of the engine 12.

Hydrogen peroxide is at least one liquid oxidizer commonly used in the above-described turbo fed rocket engine. In operation, moderate concentration levels of hydrogen peroxide (i.e., <92%) produce gas temperatures within the temperature and oxidation limits of the conventional materials used for the turbine 20. In contrast, higher concentration levels of hydrogen peroxide produce gas temperatures that exceed the temperature and oxidation limits of the materials used for the turbine 20. For example, a hydrogen peroxide liquid having a concentration level of 98% will typically result in an oxidized gas having a temperature in the range of 2200 degrees Rankin as it passes through the turbine 20.

In accordance with the present invention, a propellant supply system is provided that can utilize high concentrations of hydrogen peroxide as the liquid oxidizer. As will be more fully described below, the propellant supply system incorporates a fuel rich pre-burner that operates at a very low mixture ratio in order to drive a turbine. In this way, the temperature of the drive gas can be maintained at moderate levels, thereby enabling the use of conventional materials for the turbine.

Figure 2:
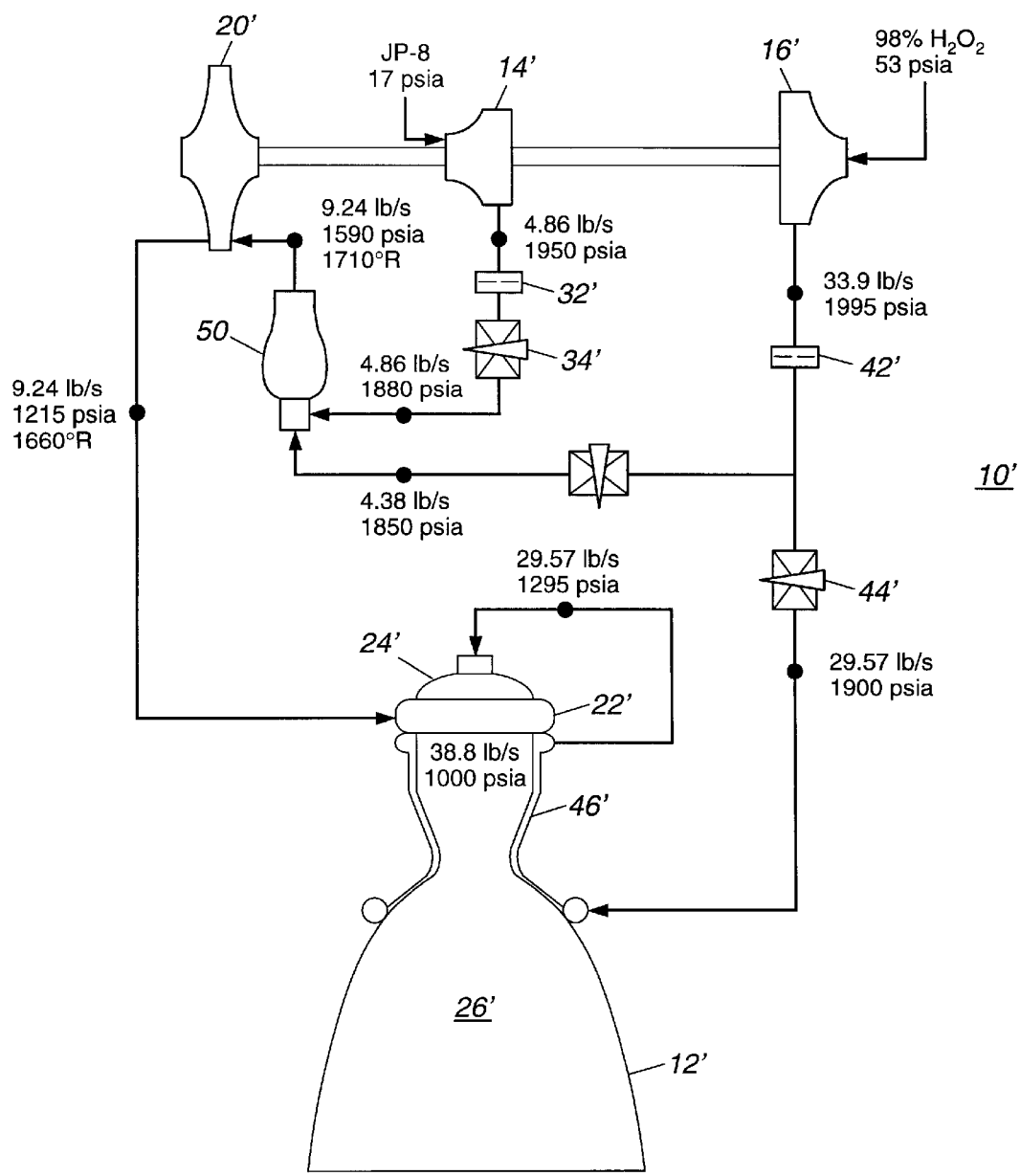
FIG. 2 is a block diagram of a propellant supply system for a turbopump fed rocket engine in accordance with the present invention.

A first preferred embodiment of the fuel supply system 10' is shown in FIG. 2. While the following description is provided with reference to hydrogen peroxide as the oxidizer, it is readily understood that the broader aspects of the present invention are also applicable to other monopropellant oxidizers that decompose at high temperatures. Exemplary monopropellant oxidizers may include (but are not limited to) ethylene-oxide, nitromethane and HAN.

As previously described, the fuel supply system 10' includes a fuel pump 14', an oxidizer pump 16', and a turbine 20'. However, in this embodiment, the fuel pump 14' provides pressurized fuel to a first gas generator 50 (alternatively, referred to as a fuel rich pre-burner). In order to reach the gas generator 50, the pressurized fuel may pass through at least one orifice 32' and a main fuel throttle valve 34'. For illustration purposes, kerosene is used as the rocket fuel (e.g., JP-8). However, it is envisioned that other types of well known rocket fuels (e.g., propane, hydrazine, methane, etc.) are also within the scope of the present invention.

In addition, a relatively small portion of the pressurized hydrogen peroxide is directed to the first gas generator 50. For instance, if the flow rate of hydrogen peroxide at the outlet of the oxidizer pump 16' is 33.9 lb/s, then a reduced flow rate of 4.38 lb/s may be directed to the first gas generator 50. As will be apparent to one skilled in the art, the precise flow rate of the oxidizer to the first gas generator 50 is dependent on the nature of the two propellants as well as other system parameters.

The first gas generator 50 operates at a very low mixture ratio to convert (i.e., burn) the liquid propellants into a fuel rich gas. In contrast to the conventional approach, the temperature of the fuel rich gas can be maintained at moderate levels. For instance, a gas generator receiving fuel at a flow rate of 4.86 lb/s at 1880 psi and hydrogen peroxide at a flow rate of 4.38 lb/s at 1850 psi may output a fuel rich gas having a temperature in the range of 1710 degrees Rankin. At this moderate temperature level, the fuel rich gas may be used to drive the turbine 20'. The turbine 20' is in turn used to drive the fuel pump 14' and/or the oxidizer pump 16'. After passing through the turbine 20', the fuel rich gas is directed to the injector 22' associated with the engine 12'.

The remaining portion of the hydrogen peroxide is directed to the engine 12'. In this circuit, the hydrogen peroxide may pass through at least one orifice 42' and a main oxidizer throttle valve 44'. At the engine, the hydrogen peroxide passes through a cooling jacket 46' that is formed along the outer surface of the combustion chamber. In this preferred embodiment, the hydrogen peroxide may enter the cooling jacket 46' having a temperature in the range of 530 degree Rankin, but exits the cooling jacket 46' having a temperature in the range of 630 degree Rankin. Thus, the hydrogen peroxide may be used to cool the main combustion chamber 26' of the engine 12'.

The second gas generator 24' is then used to decompose the heated hydrogen peroxide into an oxidizing gas before it is injected into the combustion chamber 26'. Lastly, the fuel rich gas and the oxidized gases from the second gas generator 24' are injected by the injector 22' into the main combustion chamber 26' of the engine 12'.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A propellant supply system for a turbopump fed rocket engine, comprising:

a rocket fuel source;

a source of monopropellant oxidizer that decomposes at high temperatures to the engine;

a first gas generator adapted to receive rocket fuel from the rocket fuel source and monopropellant oxidizer from the source of monopropellant oxidizer, the first gas generator operable to convert the rocket fuel and the monopropellant oxidizer into a fuel rich gas and supply the fuel rich gas to the engine;

a turbine interposed between the first gas generator and the engine, such that the fuel rich gas passes through the turbine;

a second gas generator adapted to receive a substantial portion of the oxidizer from the source of monopropellant oxidizer and operable to decompose the oxidizer into an oxidizing gas; and an injector adapted to receive the oxidizing gas from the second gas generator and the fuel rich gas from the first gas generator and operable to inject the gases into a main combustion chamber associated with the rocket engine.

2. The propellant supply system of claim 1 wherein the oxidizer is further defined as a hydrogen peroxide liquid having a concentration level greater than 92%.

3. The propellant supply system of claim 1 wherein the turbine to drive at least one of a fuel pump and an oxidizer pump.

* * * * *